April 15, 1958   E. I. DILLON   2,830,486
RESILIENT NUT WITH TENSION INDICATING MEANS
Filed Oct. 27, 1953

INVENTOR.
Edwin I. Dillon
BY
Bair, Freeman & Molinare

United States Patent Office 2,830,486
Patented Apr. 15, 1958

2,830,486

RESILIENT NUT WITH TENSION INDICATING MEANS

Edwin I. Dillon, Van Nuys, Calif., assignor to W. C. Dillon & Company, Inc., Van Nuys, Calif., a corporation of Illinois Application October 27, 1953, Serial No. 388,621

1 Claim. (Cl. 85—62)

This invention relates generally to a load indicating device, and more particularly to a unit adapted to cooperate with a fastening member for flexure in a calibrated and readable amount under specific loads imposed upon the fastening member.

One important use for such a device occurs, for example, where it is desired to determine the compressive load between a bolt head, or other loading portion of a fastening member, and the surface of an object of work being held thereby. The present practice in obtaining a reading of loads on fastening devices, such as bolts and the like, is to employ a torque wrench which provides a direct reading of the force required to rotate the bolt. Torque measurements are subject to frequent inaccuracies due to thread friction, rusting, surface binding, and similar effects. Due to such factors, measurements of the resistance of the fastening member to applied torques do not provide an accurate indication of the actual loads thereon. Further, such methods do not provide a measure of the load at the particular point where it is most desirable to make such a determination, namely, the load under the bolt head in its position of contact against the member being fastened.

Other methods of load measurement, as formerly used, have included devices for determining the elongation of a bolt or like fastening member under load. Such measurement techniques are subject to considerable error due to variations in bolt measurement, and are not adapted to accurate calibration for specific loads.

Still other devices have employed constructions comprising two separate elements adapted for relative movement upon loading of the fastening member, but such arrangements are subject to relative movements of considerable distance when the fastening member is subjected to large loads, and are only accurate at very low loads where such movements are relatively small and, therefore, adaptable to accurate calibration for specific loads.

It is a primary object of the present invention to provide a load indicating device which avoids the limitations of former prior art devices and methods, and permits obtaining a relatively accurate and direct reading of specific loads over a broad range of values from very light to very heavy.

It is another object of the present invention to provide an integral load indicating member adapted to receive a fastening device and having two superposed spaced portions, at least one of which is adapted to flex in response to loads transmitted thereto by the fastening device so as to vary the spacing between the two portions, and an indicating means calibrated to permit measurement of the distance between the two spaced portions whereby a relatively accurate determination may be made of the loads imposed on the fastening member.

It is a further object of the present invention to provide a load indicating device for cooperation with a fastening member, and having simple and reliable indicating means to permit an accurate and direct reading of variable load conditions imposed upon the fastening member.

It is still another object of the present invention to provide a load indicating device which responds directly to loads imposed upon a fastening device and allows quick and accurate visual inspection for purposes of load maintenance.

It is a still further object of the present invention to provide a load indicating washer having a clearance bore therethrough to freely receive a fastening member for cooperation therewith to permit an accurate and direct reading of variable load conditions imposed upon the fastening member.

It is still another object of the present invention to provide a load indicating nut having two superposed spaced portions, one of which has a clearance bore therethrough adapted to freely receive a fastening member and which is adapted to directly adjoin the work to be held by the fastening member, and the other of which is adapted to receive and fixedly engage the fastening member, whereby the nut and fastening member cooperate to permit an accurate and direct reading of variable load conditions imposed upon the fastening member.

With these and other objects in view, my invention consists in the construction, arrangement and combination of the various parts of my load indicating device whereby the objects contemplated are obtained as hereinafter more fully set forth, pointed out in my claim and illustrated in the accompanying drawing, wherein:

Figure 1:
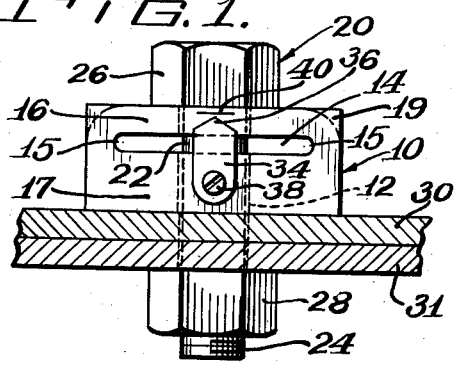
Figure 1 is a side elevation view of a load indicating device constructed in accordance with the present invention, shown in cooperative relation with a bolt and nut type of fastening member, and showing one of two types of indicator means mounted thereon.
Figure 2:
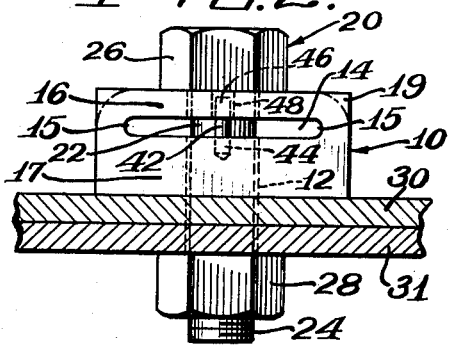
Figure 2 is another side elevation view of the construction shown in Figure 1 looking toward the construction from a direction diametrically opposite to that of Figure 1, and showing the second of the two types of indicator means.
Figure 3:
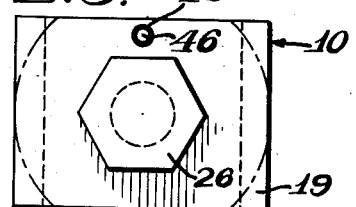
Figure 3 is a top plan view of the construction of Figures 1 and 2, showing both of the two types of indicator means as seen from above.

Referring more particularly to Figures 1 to 3 of the drawing, I have shown an embodiment of my novel load indicating device comprising a generally rectangular block or body member 10, having a vertical bore 12 extending therethrough from top to bottom. A slot 14 extends transversely across the block from side to side, at right angles to and intersecting the bore 12. The slot 14 is provided with rounded ends 15, and is of substantial width relative to the width of the block 10. It will be apparent that the slot 14 forms the block 10 into a body unit having upper and lower superposed spaced portions 16 and 17. The slot 14, as shown in this particular embodiment, is positioned closer to the top surface of the block than to the bottom surface whereby the upper portion 16 is of substantially less thickness than the lower portion 17. The block may, if desired, be rounded at its upper corners, as indicated at 19, for a purpose to be hereinafter set forth.

The bore 12 is of large enough diameter so as to freely receive a portion of a fastening device or bolt assembly 20. The assembly 20 comprises a bolt shaft 22 which passes through the bore 12. The bolt is screw-threaded at its one end 24, and is provided with a bolt head 26 at its other end. A tightening means or nut 28 is screw-threaded for engagement with the bolt end 24. The bolt head 26 and the nut 28 may be of any desired shape and are typically shown as being hexagonal in form.

In assembling the construction shown in Figures 1 to 3, the pieces of work to be fastened together, shown in cross section as plates 30 and 31 for purposes of illustration, are suitably apertured for passage of the bolt shaft therethrough. The bolt shaft 22 is first inserted through the bore 12 of the body member 10 so as to have the top surface of the body member adjoining the under surface of the bolt head 26. The portion of the bolt shaft 22 extending outwardly from the bottom surface of the body member 10 is then inserted through suitable apertures in the work pieces 30 and 31, and the nut 28 is screwed on to the threaded end 24 until the under surface thereof adjoins the surface of the adjacent work piece. The nut 28 may then be tightened so as to exert the desired compressive force for maintaining the work pieces in fixed engagement.

It will be apparent that the provision of the slot 14 in the body member 10 in the manner shown will result in a flexing of the upper portion 16 as a compressive load is applied thereto by the bolt head 26. By forming upper element 16 so as to be of substantially less thickness than element 17, the upper element 16 will tend to flex or bend downwardly before any deformation or bending occurs in the portion 17. Particularly in an arrangement such as that shown, where the extent of the work piece is sufficiently great so that the compressive fastening load is transmitted uniformly over the entire bottom surface of the body member 10, whereas the small size of the bolt head 26 relative to the upper surface of the block 10 results in the application of the fastening load substantially centrally of the upper surface of the block 10, it will be apparent that the upper portion 16 will flex downwardly in response to the application of loads without any substantial movement or flexure of the portion 17.

It will be apparent that flexure of the portion 16 in response to loads upon the body member 10 will result in a decrease in the distance of separation between the superposed spaced portions 16 and 17. That is, as the portion 16 bends downwardly toward the portion 17 under a load imposed upon the body member, the height of the slot 14 will be decreased.

I provide an indicator 34 for the purpose of measuring the flexure of the portion 16. The indicator 34 is formed with a pointed end 36 adjacent the portion 16, and is attached at its opposite end by means of a mounting screw 38 to the portion 17. In this manner the indicator will remain fixed relative to portion 17, and flexure of portion 16 will result in relative movement of that portion with respect to the pointed end 36. One or more calibration lines 40 may be positioned at any suitable point along the edge of portion 16 for cooperation with the pointed end 36 of the indicator 34. The increment of distance between the pointed end 36 and the calibration 40, when the body member is in an unloaded condition, may be suitably selected so as to represent the distance to which the portion 16 will be flexed or deformed downwardly upon the application of a specified load thereon by the fastening device.

In the embodiment of Figures 1 to 3 I have provided two types of indicator means for purposes of illustration, although in actual practice only one or the other need be used. The first type has been heretofore described. The second type is clearly shown in Figure 2, and comprises an elongated indicator pin or rod 42 suitably fixed at its one end 44 to the portion 17 and freely slidable at its other end 46 within a bore in the portion 16. The length of the pin 42 is such that normally, without load on the device, the terminal portion of the upper end 46 lies a suitable distance below the upper surface of the block 10. In this manner the pin 42 will lie wholly within the body 10 during a no-load condition, and upon application of a load and consequent downward flexure of the portion 16 the upper end of the pin 46 will change its position relative to the upper surface of the body 10 as the portion 16 and its bore move downwardly relative thereto upon application of load. The increment of distance between the upper end 46 of the pin 42 and the upper surface of the body 10, when the body is in an unloaded condition, may be suitably selected so that the end 46 will either be flush with the upper surface of the body 10 at a specified load, or, if preferred, will extend slightly above the upper surface of the body 10 to provide a readily visible indicator, suitably colored or scribed.

Figure 4:
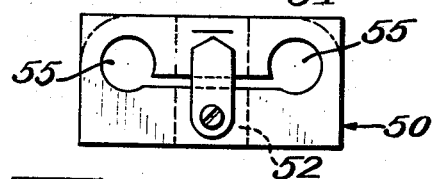
Figure 4 is a side elevation view of a modified form of load indicating device.
Figure 5:
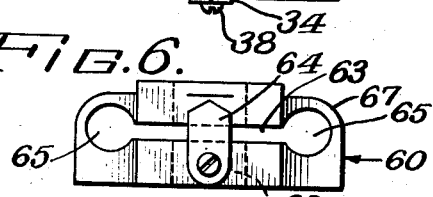
Figure 5 is a top plan view of the modified form of Figure 4.

Referring now more particularly to Figures 4 and 5, I have illustrated a modification of the embodiment shown in Figures 1 to 3 wherein the slot is formed in a different manner. A block or body member 50 is provided with a central bore or clearance hole 52 in substantially the same manner as the bore 12 of body member 10. A transverse slot 54 similar to the slot 14 is also provided. In forming the slot 54 the block is first drilled so as to provide transverse bores 55. The slot 54 may then be sawed or milled out between the bores 55. It will be apparent that the bores 55 will aid in the formation of the slot, and will further serve to provide rounded side edges for the slot to facilitate flexure of the upper portion of the block during loading by providing a reduced material thickness at the upper corners of the block, as well as stress relief at the ends of the slot. As shown, the slot is positioned slightly above the center line of the block 50 so as to assist the flexure of the upper portion of the body while the lower portion remains relatively fixed during loading. The indicator means employed may be understood to be the same as in the construction illustrated in Figures 1 to 3.

Figure 6:
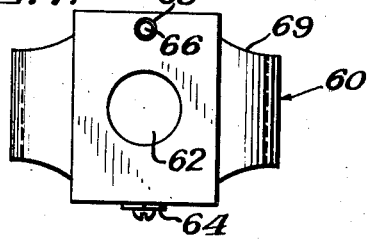
Figure 6 is a side elevation view of still another modified form of load indicating device.
Figure 7:
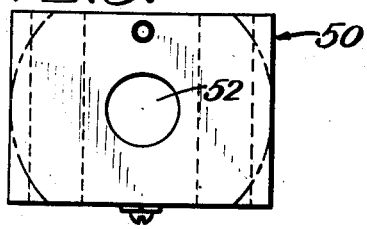
Figure 7 is a top plan view of the modified form of Figure 6.

In Figures 6 and 7 I have illustrated another embodiment of the present invention comprising a block or body member 60 having a central bore or clearance hole 62, and including a slot 63 having edge bores 65. As clearly shown in Figure 6, the slot 63 has been positioned substantially midway of the height of the block rather than somewhat thereabove as in the form of Figures 1 through 3. In certain instances, where it is desirable to provide substantially more flexure or movement for measurement purposes, the positioning of the slot medially of the block is more advantageous.

It will be apparent that measurement of block flexure may be accomplished either by an indicator 64, identical in structure to indicator 34 shown in Figure 1, or by an elongated indicator pin having an upper end 66 slidable relative to the upper portion of the body member within a bore 68, in the same manner as the pin 42 shown in Figure 2. The embodiment of Figures 6 and 7 has been suitably contoured to reduce the cross section at the junction between the upper and lower portions of the body member, so as to provide stress relief during flexure of the upper portion of the body member. The entire upper end edges of the block are shown rounded at 67, and the side wall portions adjacent thereto are also contoured, as at 69.

Figure 8:
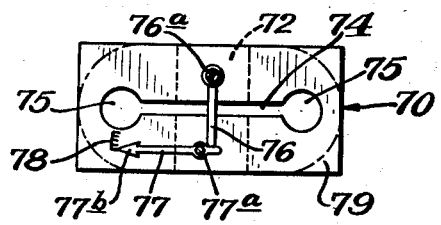
Figure 8 is a side elevation view of a load indicating device employing a third type of indicator means.

In all of the embodiments heretofore described, either of the two types of indicator means illustrated may be employed. In Figure 8 I have illustrated a third type of indicator means which is intended to provide greater reading accuracies over a wide range of load values. I have shown a body member 70 having a central bore 72 and a transverse slot 74, with terminal edge bores 75. The slot 74 is positioned substantially along the center line of the block for the purpose of providing flexure of both the upper and lower spaced portions of the body member so as to obtain the largest possible amount of flexure or movement. A first rod 76 is fixedly attached at one end to one of the spaced body portions at 76a. The other end of the rod 76 engages a terminal portion of a second rod 77, which is pivotally mounted at 77a to the other spaced portion of the body member. The rod 77 is provided at its free end with a pointer 77b, which cooperates with a calibrated arc 78, suitably scored upon the surface of the body member. It will be apparent that flexure of one of the spaced portions with respect to the other body portion of the body member 70 will cause the end of the rod 76, opposite to the mounting point 76a, to engage and move the terminal portion of the rod 77, rearwardly of its pivot point 77a, and effect a movement of said rod 77 so as to cause the pointer 77b, to swing in an arcuate path relative to the calibrated surface of the block 70. By such a lever arrangement it is apparent that relatively small movements of flexure may be substantially magnified for accurate reading along the calibration 78. In this particular embodiment, I have also shown all of the end corners of the body member 70 as being rounded at 79 for suitable stress relief, and to facilitate flexure of the body portions.

Figure 9:
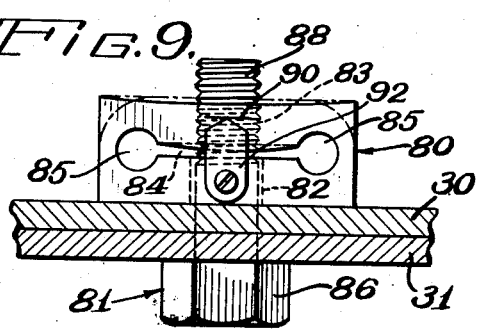
Figure 9 is a side elevation view of a load indicating device constructed in accordance with the present invention in the form of a screw-threaded nut, and shown in cooperative relation with a screw-threaded bolt.

In all of the embodiments heretofore described the block or body member has been provided with a center bore or clearance hole which is adapted to freely receive the shaft of a bolt or similar portion of a fastening device. In such constructions the load indicating device of the present invention constitutes a washer member. In a still further embodiment of the present invention, as shown in Figure 9, I have illustrated a form wherein the load indicating device constitutes a nut member. The body member 80 is provided with a central bore 82, and a transverse slot 84 having terminal end bores 85. The bore 82 provides a clearance passage through one of the spaced portions of the body member and is screw threaded at 83 through the other spaced portion of the body member. A bolt assembly 81 having a head 86 and a shaft 88, suitably screw threaded, is provided for cooperation with work pieces 30 and 31, to be fastened together. It will be apparent that the bolt may be first passed through suitable apertures in the work pieces 30 and 31, and that the load indicating device may be then screwed onto the threaded bolt shaft in the manner of a tightening nut. In this manner, by holding the nut or body member 80 and tightening the bolt head 86, or vice versa, the upper portion of the body member 80 will be caused to flex downwardly, as shown in solid lines, from its normally horizontal unloaded position, shown in dotted lines. Application of the load by tightening of the bolt will cause the calibration line 90 to move toward the pointed end of the indicator means 92, as the upper body portion flexes downwardly. As shown in Figure 9, the fastening member has been tightened to the desired load, and the indicator clearly shows the existence of the load by its position with respect to the calibration line. In the arrangements shown in Figures 1 and 2 the fastening member has been illustrated in a free or unloaded condition so that an increment of distance appears between the calibration lines or surfaces and the indicator means. A comparison between Figure 9 and Figure 1 clearly shows the manner in which the calibration line moves relative to the indicator means so as to show the presence or absence of a load upon the fastening device.

I have shown several embodiments of the present invention, in the form of both a washer and a nut, and utilizing a variety of indicator means. In the actual construction to be selected for any particular use, the indicator device may be of any desired form, either rectangular, as shown, or square, circular, or otherwise shaped. The dimensions of the body member relative to widths and thickness may be suitably selected for the particular environment of use and type of loads to be imposed. For example, substantially heavy loads will require a block of greater thickness so as to support the forces to be applied and permit flexure of the body member without permanent deformation thereof. In general, it is preferable to select the depth of the slot so that its depth is slightly greater than the extent of flexure of the upper body portion. In this way, the slot is deep enough to permit the required flexure which results under a predetermined maximum load, thereby preventing possible overloading of the indicating device and the fastening member.

It will be apparent that by varying the dimensions of the body member, by varying the width and depth of the slot and the diameter of the terminal end bores thereof, and by rounding corners and surfaces to provide reduced wall thicknesses for purposes of stress relief and for purposes of permitting flexure at the desired point, the load capacity of the indicating device of the present invention may be suitably adapted to load conditions of any practical magnitude from very small to a very great range.

In the embodiment of Figures 6 and 7, and as indicated by the dot-dash lines of Figures 4, 5 and 8, the rounded and thinned outer corners of the block or body member serve to locate substantially all of the flexure during load at the reduced corner portions. In this manner, arcing or dishing of the upper spaced body portion at the area adjacent the bolt head, where the upper body portion is of substantial thickness relative to the thinned corners, is avoided. The rounded and thinned contours which I have disclosed serve to illustrate the manner in which appropriate reduction of wall thickness at selected points is effective, both for facilitating block flexure and for locating main flexure at points remote from the immediate area of load application adjacent the load transmitting surface of the bolt.

Changes may be made in the construction and arrangement of the parts of my load indicating device without departing from the real spirit and purpose of my invention, and it is my intention to cover by my claim any modified forms of structure or use of mechanical improvements which may be reasonably included within their scope.

I claim:

A load indicating device adapted to form a part of a fastener for securing a plurality of members together comprising a generally rectangular body member having a slot extending therethrough opening at opposite ends into circular openings of larger diameter than the width dimension of the slot, thereby forming an elastically deformable unit including opposed central body portions on either side of said slot and end body portions surrounding said openings, said end body portions being narrower than said central body portions in the direction of the axis of said openings to facilitate flexure of said opposed central body portions with respect to each other, a bore extending completely through said central body portions at right angles to said slot, the portion of said bore on one side of the slot providing an enlarged clearance passage freely receiving a cooperating fastening bolt, the portion of said bore on the other side of said slot being screw threaded to cooperatively engage said bolt, and a deflection indicator including a finger and a cooperating mark carried by said central body portions above and below said slot.

References Cited in the file of this patent

UNITED STATES PATENTS

| | | |
|---|---|---|
| 1,449,683 | Lippold | Mar. 27, 1923 |
| 1,537,819 | Grimm | May 12, 1925 |
| 2,326,285 | Burke | Aug. 10, 1943 |
| 2,413,797 | Stone | Jan. 7, 1947 |
| 2,436,317 | Manjoine | Feb. 17, 1948 |
| 2,464,152 | Ralston | Mar. 8, 1949 |
| 2,476,561 | Pedersen | July 19, 1949 |

FOREIGN PATENTS

| | | |
|---|---|---|
| 54,812 | Sweden | June 13, 1923 |
| 624,801 | Germany | Mar. 31, 1933 |